(12) United States Patent
Reales Bertomeo

(10) Patent No.: US 11,534,027 B2
(45) Date of Patent: Dec. 27, 2022

(54) DUAL GRILL APPLIANCE

(71) Applicant: reamotion GmbH, Delmenhorst (DE)

(72) Inventor: Emilio Reales Bertomeo, Delmenhorst (DE)

(73) Assignee: REAMOTION GMBH, Delmenhorst (DE)

( * ) Notice: Subject to any disclaimer, the term of this patent is extended or adjusted under 35 U.S.C. 154(b) by 894 days.

(21) Appl. No.: 16/315,654

(22) PCT Filed: Jul. 5, 2017

(86) PCT No.: PCT/EP2017/066825
§ 371 (c)(1),
(2) Date: Jan. 6, 2019

(87) PCT Pub. No.: WO2018/007467
PCT Pub. Date: Jan. 11, 2018

(65) Prior Publication Data
US 2019/0335948 A1    Nov. 7, 2019

(30) Foreign Application Priority Data

Jul. 6, 2016    (DE) ............... 20 2016 103 619.4

(51) Int. Cl.
*A47J 37/07* (2006.01)
*A47J 39/02* (2006.01)
*G05D 7/06* (2006.01)

(52) U.S. Cl.
CPC ....... *A47J 37/0713* (2013.01); *A47J 37/0786* (2013.01); *A47J 39/02* (2013.01); *G05D 7/0635* (2013.01)

(58) Field of Classification Search
CPC .... A47J 37/0713; A47J 37/0786; A47J 39/02; G05D 7/0635
(Continued)

(56) References Cited

U.S. PATENT DOCUMENTS

| 1,548,185 A * | 8/1925 | Carr ................. F24C 3/14 |
| | | 126/40 |
| 4,046,132 A | 9/1977 | White |

(Continued)

FOREIGN PATENT DOCUMENTS

| CN | 2927931 Y | 8/2007 |
| CN | 204306623 U | 5/2015 |

(Continued)

OTHER PUBLICATIONS

International Search Report and Written Opinion issued in PCT/EP2017/066825, dated Sep. 11, 2017.

(Continued)

*Primary Examiner* — Avinash A Savani
(74) *Attorney, Agent, or Firm* — BakerHostetler

(57) ABSTRACT

A grill device having at least a first gas grill unit and a second gas grill unit for cooking food is described. The grill device includes a stand which carries the grill units and is intended for placement on the ground, and a base cabinet which is housed in the stand, and a central work unit disposed at a head end of the stand. The two grill units are fastened to the stand laterally from the work unit substantially opposite one another. Each grill unit includes a grill tray having a burning unit.

35 Claims, 6 Drawing Sheets

(58) Field of Classification Search
USPC .................................................. 126/36, 25 R
See application file for complete search history.

(56) References Cited

U.S. PATENT DOCUMENTS

| | | | |
|---|---|---|---|
| 4,886,045 A | 12/1989 | Ducate, Jr. et al. | |
| 5,003,960 A | 4/1991 | Hanagan | |
| 5,035,516 A * | 7/1991 | Pacheco | A47J 37/0786 383/41 |
| 5,632,265 A | 5/1997 | Koziol | |
| 6,640,800 B1 * | 11/2003 | Hodgson | A47J 37/0713 126/25 R |
| 6,761,160 B1 * | 7/2004 | Haygood | A47J 36/2477 126/25 B |
| 7,249,771 B1 * | 7/2007 | Brennan | A47J 37/0704 280/35 |
| 10,105,007 B2 | 10/2018 | Colston | |
| 2008/0163862 A1 * | 7/2008 | Cartwright | A47B 55/00 126/25 R |
| 2008/0190408 A1 * | 8/2008 | Hsu | F24C 3/14 126/36 |
| 2010/0275898 A1 * | 11/2010 | Jansson | A47J 37/0704 126/25 R |
| 2013/0298896 A1 | 11/2013 | Johnson | |
| 2013/0312732 A1 * | 11/2013 | Brennan | A47J 37/0713 126/25 R |
| 2014/0090635 A1 * | 4/2014 | May | G01F 23/20 126/25 R |
| 2014/0113039 A1 | 4/2014 | Barkhouse | |
| 2015/0150404 A1 | 6/2015 | Albizuri Landazabal et al. | |

FOREIGN PATENT DOCUMENTS

| | | |
|---|---|---|
| CN | 104706231 A | 6/2015 |
| DE | 26 45 867 A1 | 6/1977 |
| DE | 9215234 U1 | 4/1993 |
| DE | 36 87 663 T2 | 8/1993 |
| DE | 20308226 U1 | 3/2004 |
| DE | 602004004666 T2 | 11/2007 |
| DE | 102013008272 A1 | 12/2014 |
| DE | 212015000017 U1 | 5/2016 |
| FR | 2 958 521 A1 | 10/2011 |

OTHER PUBLICATIONS

Search Report issued in German Application No. 20 2016 103 619.4, dated Feb. 17, 2017.

* cited by examiner

DUAL GRILL APPLIANCE

CROSS-REFERENCE TO RELATED APPLICATIONS

This application is a National Stage of International Patent App. No. PCT/EP2017/066825, filed on Jul. 5, 2017, which claims priority to German Patent App. No. DE 20-2016-103-619.4, filed on Jul. 6, 2016, the disclosures of which are incorporated by reference in their entirety.

FIELD OF THE INVENTION

The invention relates to a grill device having at least one grill unit for grilling food, in particular gas grill unit, a stand which carries the grill unit and is intended for placement on the ground, and a base cabinet, which is housed in particular in the stand.

BACKGROUND

Such grill devices, also known as grill stations, are known. These are often used in the private sector or in the semi-professional or professional catering sector, on terraces or in gardens. The stand is often provided with wheels to move the grill device on a terrace or the like. Other embodiments include a stand which is tower-shaped or pillar-shaped, and a base cabinet housed in the stand. Of course, such base cabinets can also be provided in stands which comprise a plurality of struts and rollers.

SUMMARY OF THE INVENTION

In particular, the invention relates to a gas grill device in which the grill unit is formed as a gas grill unit. Such gas grill devices enjoy particular popularity, since they offer good taste, yet are easy to clean and generate little effort when grilling.

The object of the present invention is to further develop a known grill device, in particular with regard to the possible applications.

In a first aspect of the invention, the object is achieved in a grill device of the type previously mentioned, characterized in that a cooling unit for cooling raw grill food is disposed in the base cabinet. The cooling unit is preferably formed as a closable refrigerator or closable cooling compartment and comprises inner lateral guide rails and receptacles for guiding a sheet or a plate. The sheet or plate can then be pushed into the cooling unit or pulled out of it by an operator. The sheet or plate is used to receive raw grill food and this can be stored in the cooling unit before grilling. The refrigerator or the cooling compartment can be provided with a separate door, or the door is integral with a door of the base cabinet.

In a second aspect of the invention or in a preferred embodiment, the grill device of the type previously mentioned comprises a warming unit in the base cabinet for keeping food warm. The warming unit preferably comprises a warm cabinet or a warm compartment. The warming unit is used to keep already grilled food warm and possibly also for recooking grilled food. Particularly preferred here is the grill device formed as a gas grill device. Preferably, the warm cabinet or the warm compartment is connected to the grill unit such that warm air is conducted from the grill unit into the warm compartment. This warm air can be exhaust air that contains combustion gases, or air that is warmed by convection on an outside of the grill unit. The warming unit is preferably adjacent to the cooling unit, in particular below it, in which the base cabinet is disposed.

The warming unit also preferably includes inside lateral guide rails and receptacles for guiding a sheet or a plate such that the sheet or plate can be inserted in the warming unit or pulled out of it by an operator. This makes the operation very easy. It can be provided that, in particular, flue gases are conducted into the warming unit in order to use the warming unit as a type of "smoker".

In a further preferred embodiment or in a further aspect of the invention, the grill device comprises a gas cylinder receptacle for carrying a gas cylinder for supplying fuel gas to the grill unit, wherein the gas cylinder receptacle comprises a weighing unit for weighing the gas cylinder. If a grill device is formed as a gas grill device, it is known to provide a gas cylinder receptacle for carrying the gas cylinder. The gas cylinder receptacle is preferably also housed in the base cabinet or in the stand. According to the invention, the gas cylinder receptacle comprises a weighing unit for weighing the gas cylinder. The gas cylinder receptacle is preferably housed in a drawer, which is equipped with a latching mechanism and a compression spring. Pressing the latching mechanism releases this and the drawer, together with gas cylinder, moves automatically out of the base cabinet. It is thus easy to change the gas cylinder. An operator, for example, briefly presses his foot against the drawer to release the latching mechanism.

Preferably, the grill device further comprises a control unit which is connected to the weighing unit. The control unit is set up to receive signals from the weighing unit, wherein the signals represent the weight of the gas cylinder. The control unit then determines the gas volume in the gas cylinder based on these signals. The weight of the gas cylinder without gas is known and by weighing the total weight of the gas cylinder together with gas and the known weight of the gas cylinder without gas, the weight of the gas in the gas cylinder can be determined. As a result, the gas volume of the gas cylinder can be determined. The tare weight is indicated on commercially available gas cylinders. It can be provided that an operator enters this tare weight into the control unit via a corresponding input device, or the control unit reads out the tare weight automatically via suitable reading means, such as a camera or a bar code scanner.

Preferably, the control unit is further set up to determine a residual burn time of the grill unit based on the signals of the weighing unit. The residual burn time can also be determined with known current gas consumption and known gas volume. Preferably, a plurality of residual burn times is determined based on different scenarios. For example, a scenario comprises a minimum scenario based on minimal gas consumption if an operator controls the flame of the grill unit to a minimum. Another scenario includes a maximum scenario in which an operator maximally controls the gas flame of the grill unit.

The control unit preferably comprises a display and is set up to display the gas volume and/or the residual burn time on the display. The residual burn time is preferably displayed in the different scenarios. This gives an operator the information on how long he can still grill, based on a corresponding scenario.

In a further preferred embodiment, the control unit is set up to be connected wirelessly to a portable mobile device, in particular a tablet PC or a smart phone. Preferably, the gas volume and/or the residual burn time are displayed on a display of the portable mobile device. Further, the control unit is set up to receive control commands from the portable mobile device and to provide corresponding position actions in response. If the grill dew vice is formed as a gas grill device, one or more valves are preferably provided between the gas cylinder and corresponding fuel rods of the grill units. The valve or valves are preferably connected to the control unit and the control unit sets the valve or valves in response to received control commands so as to throttle the gas supply in accordance with the control commands. This allows an operator to operate the grill device from a remote location.

Preferably, the portable mobile device and the control unit communicate by means of a radio link, for example based on the Bluetooth® standard, W-Lan standard, and/or via the Internet. For example, if the control unit is connected to the Internet, the portable mobile device can also be connected to the Internet and send signals to the control unit in this way.

According to a further preferred embodiment or a further aspect of the invention, a grill device according to the type previously mentioned comprises a central work unit at a head end of the stand, and two grill units which are attached to the stand laterally from the work unit substantially opposite one another, wherein each grill unit comprises a burning unit on the grill trays.

The individual grill units are connected, for example, by hooking, form-fitting with the stand. As a result, they can be removed reversibly and stored separately and/or cleaned.

The central work unit preferably comprises a counter top, a separate gas grill, an electric grill, a hob, a plate storage or the like. In common embodiments, the central work unit will comprise a counter top.

The provision of two separate grill units is advantageous in that they can be operated with different fuels. For example, a first grill unit is operated with gas, while charcoal is used in the other. The charcoal is preferably provided to a designated basket, which is inserted into the corresponding grill tray. Thus, one can react to different tastes with a grill device. Similarly, one grill unit can be used only for vegetarian grill food while the other grill unit is designated for meat products. This leads to an actual spatially complete separation of the food and meets the religious or ethical needs of some operators.

Furthermore, this arrangement is particularly advantageous in that the central work unit is disposed centrally between the two grill units. Thus, an operator of the grill device is not directly in front of the hot grill units, but rather in front of the work unit. This is, on the one hand, comfortable due to the lower heat and also allows for easier work on the work unit.

The grill trays can be preferably completely closed by means of a hood, wherein the hoods are preferably each pivotally attached to the corresponding grill unit, and preferably a damping device is provided for damping the movement of the hoods. The hoods can also be completely separate and formed as a simple cover. If the hoods are attached by means of a damping device, the damping device is preferably disposed on the inside. The damping device is also used to hold the hoods in a vertically open position, so that grilling can be carried out unhindered.

In a preferred embodiment, the grill trays are formed hemispherical, trough-shaped, rectangular box-shaped, square box-shaped, cylindrical with a closed bottom, conically tapering down, or frustoconical tapered down, ellipsoid or the like. It should be understood that any shape can be provided, wherein a hemispherical shape therefore is offered, as it is easy to clean and causes a visually good overall impression, similar to a panopticon.

Furthermore, the burning units in the grill trays are preferably interchangeable for changing the energy source. The burning units comprise one or more burner strips, in which fuel gas is conducted to and from which fuel gas can escape. Preferably, the burning units are removable, and replaceable, for example, by a basket or the like, so that the grill trays can also be used for grilling by means of coal, pellets, briquettes or the like. For example, during operation, a first grill tray can be operated by means of gas, while a second grill tray is operated by means of coal. If the gas burning unit is left in the grill tray and the basket is only fitted with coal, this has the advantage in that the gas burning unit can be used to ignite the coal and does not have to resort to alcohol or the like.

Furthermore, it is preferred that the grill device comprises a mechanical unit, by means of which the two grill trays can be pushed together and/or hinged together to form a substantially closed space. In this closed state, the interior of the grill trays is closed and largely protected against the ingress of rainwater, for example. Furthermore, a grill grate or the like, which is disposed in the grill trays, is also protected from contamination. The mechanical unit preferably comprises hinge joints and/or guide rails.

In a further preferred embodiment, the grill device comprises an insert element, which can be disposed between the grill trays and comprises a plurality of passage openings. The insert element preferably connects the peripheral edges of the grill trays in the closed state and keeps the two grill trays slightly spaced from each other. The passage openings are used to allow air to pass through the insert element. The insert element can be formed in accordance with a grid. If the grill device is operated with gas in this folded-together state, hot air can escape through the insert element and the grill device can be used as a patio heater in this way. It can also be provided that two insert elements are provided, which are each disposed permanently at the upper edges of the grill trays. Alternatively or additionally, no insert element is provided, but the grill trays themselves comprise passage openings which can be closed. In this way, the grill device can also be used as a patio heater.

In a further preferred embodiment or a further aspect of the invention, the grill device comprises a rinsing device for rinsing and cleaning the grill device. Preferably, the rinsing device comprises in each case at least one rinsing element in each grill tray. The rinsing elements are preferably rotating. Such a rinsing element is formed, for example, as a rotating nozzle, or according to a blade of a conventional dishwasher. Preferably, the rinsing elements are made of fire-proof material, such as metal. The entire rinsing device is preferably constructed in accordance with conventional dishwashers.

In a state of the grill device in which it is designed for grilling operation, the grill trays are preferably designed with a heat-insulating plate. The heat-insulating plate is provided in a variant only in a bottom region of the grill tray and is used to cover the rinsing elements. Such a heat-insulating plate is formed, for example, as a sandwich plate and can be taken out manually when a rinsing operation is provided.

The rinsing device preferably comprises its own control unit, or is coupled to the control unit of the grill device. The rinsing device preferably comprises its own electrical connection, by means of which the rinsing device can be connected to a conventional network.

The rinsing device furthermore preferably has a water tank, which in particular comprises a service water container and a fresh water container. The fresh water container is preferably filled with fresh water, which is used for rinsing. Alternatively or additionally, the rinsing device can be connected to a water source, such as a garden hose. A corresponding valve and an inlet are preferably provided on the grill device. Furthermore, the service water container is provided to receive dirty, already used water for rinsing. Both the service water container and the fresh water container are preferably disposed in the stand and/or the base cabinet. The rinsing device preferably further comprises one or more pumps to pump fresh water from the fresh water tap container to the rinsing elements, and/or to circulate service water and also to supply the rinsing elements. The pumps are preferably coupled to the control unit. If the pumps are coupled to the control unit of the grill device, it is further preferred that the control unit is set up to receive from the portable mobile device capable of controlling the rinsing device and to control in response to the rinsing device in accordance with the commands. For example, the pumps are turned on in response to a corresponding command and the rinsing process is started. This can then be done by an operator from a remote location, which substantially simplifies the operation of the device.

According to a further preferred embodiment, the grill trays are formed double-walled with a first outer wall and a second wall spaced from the first. The first and second walls can be formed of the same material. Preferably, spacers are provided between first and second walls. For example, it is conceivable to connect the first and second walls to one each other by means of individual struts. However, it is advantageous to provide as few thermal bridges as possible. At the same time, however, a stable construction is to be achieved. Particularly preferably, the first and second walls are connected to one another at end sections, in particular in the region of a grill surface. Here, for example, perforated plates can be provided to ventilate the intermediate space between the first and second wall.

A first insulating material can be disposed between the walls. Preferably, the first insulating material has a thermal conductivity in a range of less than 0.5 W/(mK), preferably less than 0.1 W/(mK), preferably in a range of 0.004 to 0.045 W/(mK). Preferably, a glass wool, rock wool, mineral wool, vacuum insulating material, glass foam, gas concrete, or the like is used as insulating material.

The insulating material preferably has a thickness in a range of 1 cm to 5 cm, preferably 1 cm to 3 cm, particularly preferably 2 cm to 3 cm. The insulating material preferably has a substantially uniform thickness so that the distance between the first and second walls is also in this range. In addition to the first insulating material, a second insulating material can be provided between the first and second walls. The second insulating material can be disposed in a second layer, so that the first and second insulating material adjoin one another in a planar manner in the intermediate space between the first and second walls. It can also be provided that the second insulating material is provided only in a region which receives a particularly high heat input. In addition to the first and second insulating material, third, fourth and so on insulating materials can also be provided in order to achieve a particularly good thermal insulation.

The presence of grill tray double walls already leads to thermal insulation. Preferably, the presence of grill tray double walls is formed such that air can flow into the intermediate space. As a result, a risk of injury is reduced when people come into contact with an outer region of the grill trays. Furthermore, an effective grilling can also be improved in this way, since less heat loss prevails. The heat is better contained inside the grill tray and is directed to the grill food. As a result, less fuel, or less energy is used during grilling, so that the environmental impact is lower and the grill device is formed environmentally friendly overall.

According to a further preferred embodiment, the outer wall comprises at least one opening for a light exit. Such an opening can be formed, for example, as a small bore, elongate slot, or as a contour which defines a particular geometry, such as a logo, a pictogram, a letter, or the like. The opening can be provided with a transparent element, or a light source is mounted directly in the opening.

In a preferred development, the grill device comprises at least one projector which is set up to project user information onto a projection surface disposed adjacent to the grill device. Such a projector can comprise for example, a pattern or slit cut in the outer wall and a light source located behind it so that a shadow of the pattern or slit is projected onto the ground. However, such a projector can also comprise a simple LED or an LED array, which projects a pattern onto the projection surface by means of a corresponding lens combination. The projection surface is preferably a ground on which the grill device is placed. For example, it is conceivable, when two grill trays are provided to form the projector such that in each case adjacent to the corresponding grill tray, information about the grill food is projected onto the ground. For example, it is conceivable that the word "fish" or a logo which represents a fish is projected onto the ground adjacent to the first grill tray. In a corresponding manner, the word "meat" or a corresponding logo can be projected to the second grill tray. Many other variants are conceivable here, in particular pictograms of different types of vegetables or generally the word "vegetarian", "Mediterranean", "BBQ" or the like.

Furthermore, it is preferred that the grill device comprises at least one illumination device which is disposed at least partially within the intermediate space between the first and second walls. Preferably, this illumination device is protected by the insulating material. The illumination device can comprise a direct light source in the intermediate space, or only a light guide which extends from an inner region of the grill device, in particular the base cabinet, up into the intermediate space.

In a further preferred embodiment, the illumination device comprises a plurality of LEDs, which are disposed in a predetermined pattern in the outer first wall. For example, it is conceivable that a strip or a plurality of strips are illuminated on the outer wall. It is also possible that different patterns are provided here. For example, if an embodiment is provided in which the grill trays are formed substantially hemispherical, it is conceivable that a kind of star pattern, in particular one which corresponds to the natural starry sky, is formed in the second wall. For this purpose, LED elements of different sizes or brightness can be used. It is also possible and conceivable to reproduce profiles of land sections by means of individual or several LEDs, so that a map, in particular a globe, appears on a substantially hemispherical grill tray. Many possibilities are conceivable here.

BRIEF DESCRIPTION OF THE DRAWINGS

The invention is explained in more detail below on the basis of an exemplary embodiment with reference to the enclosed figures, in which.

DETAILED DESCRIPTION

Figure 6:
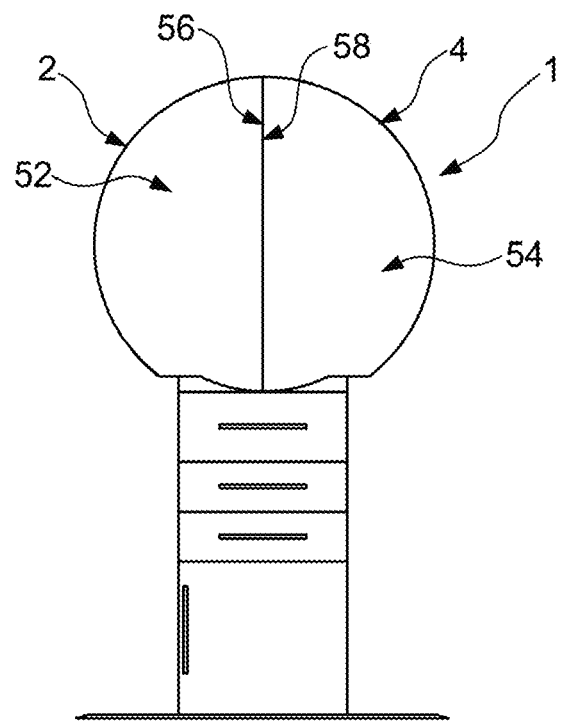
FIG. 6: shows a schematic front view of the grill device with closed grill trays.
Figure 7:
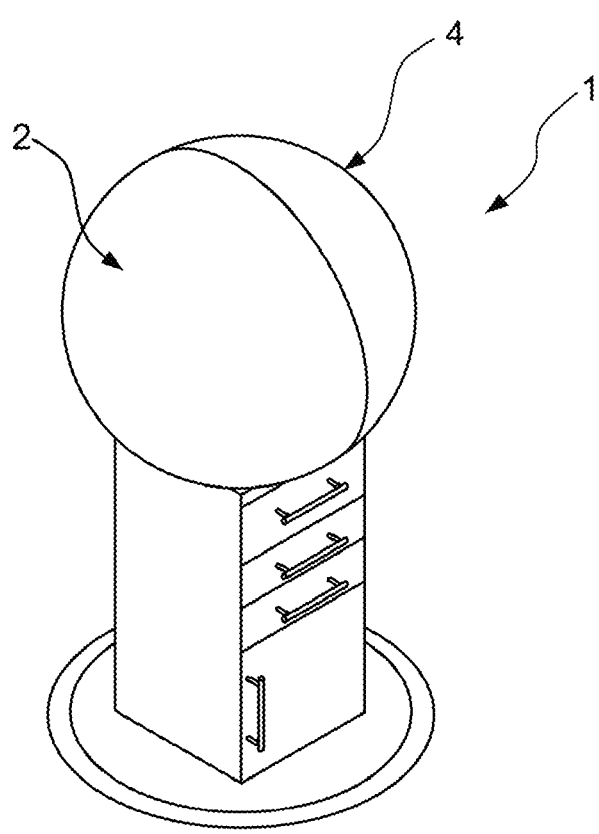
FIG. 7: shows a schematic perspective view of the grill device with closed grill trays.

While FIGS. 1 to 5 show a grill device 1 in which two grill units 2, 4 are shown in a folded-out state, FIGS. 6 and 7 illustrate the grill device of FIGS. 1 to 5 with folded-in grill units 2, 4.

The grill device 1 comprises a stand 6, which is designed as a tower. The stand 6 comprises a base cabinet 8 formed in the stand 6 and a base plate 10. The grill device 1 can be placed on a ground, such as a terrace, by means of the base plate 10. The base cabinet 8 forms the columnar part of the stand 6 and is used to carry the entire structure of the grill device, in particular a central counter top 12 and the two grill units 2, 4. This particular arrangement has the advantage that an operator can frontally stand in front of the counter top 12 while he operates the two grill units 2, 4. As a result, he is, on the one hand, protected from the heat of the grill units as in conventional grill devices and on the other hand, the two fully separated grill units 2, 4 are used to prepare food with different energy sources or for different eating habits.

Figure 4:
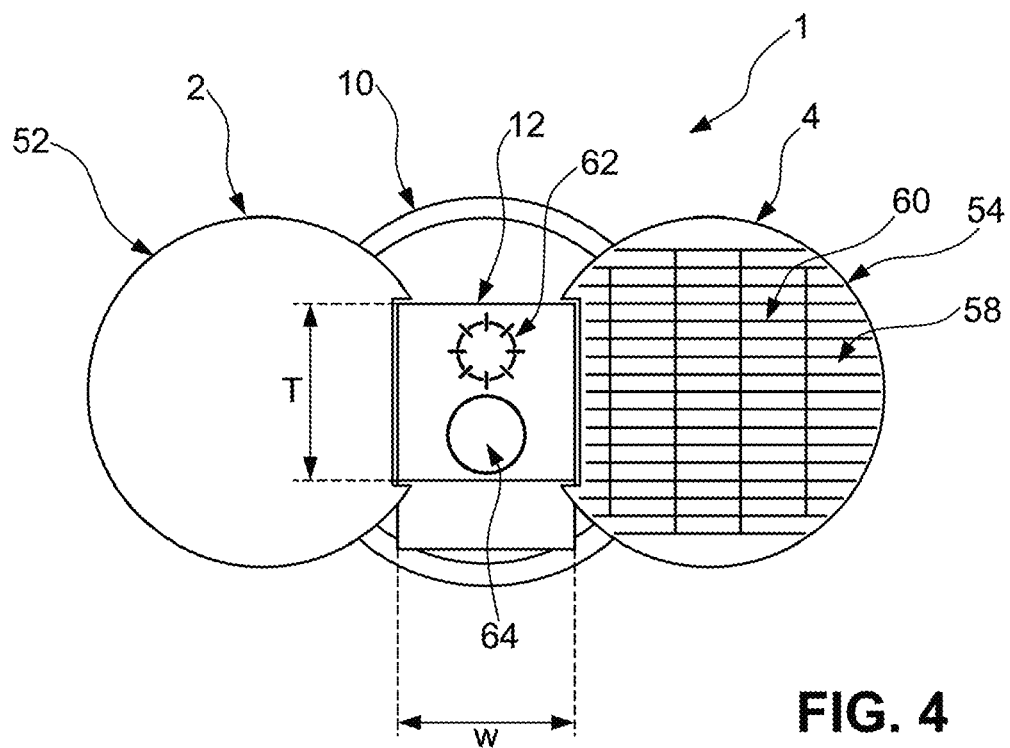
FIG. 4: shows a schematic plan view of the grill device.
Figure 5:
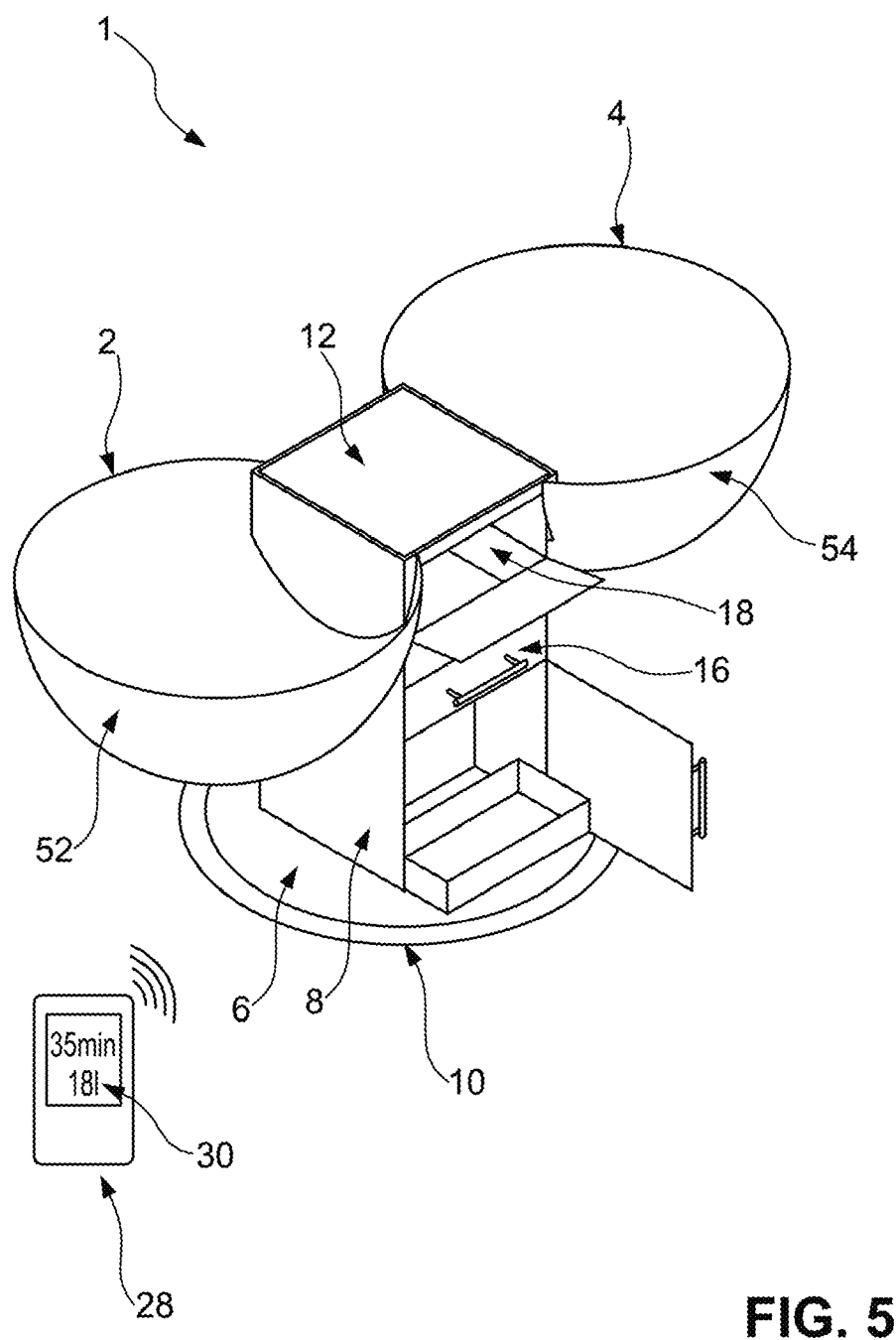
FIG. 5: shows a schematic perspective view of the grill device.

FIG. 4 shows a variant in which a separate gas hob 62 and a plate storage 64 are provided in the counter top. A stack of plates is receivable in the plate storage and is readjusted by a spring pre-load on the bottom of the plate storage, so that the top plate is usually kept slightly above the counter top 12. The plate storage 64 is preferably heated by means of exhaust air from a grill unit 2, 4 to preheat the plates. The hob 62 is preferably fed from the gas cylinder 20 and is used, for example, for preparing sauces and/or coffee.

The base cabinet 8 comprises a cooling unit 14, which comprises a closable cooling compartment, wherein inside lateral guide rails and receptacles for guiding a sheet or a plate are provided. Below the cooling compartment 14, a warm compartment 16 is formed, which is formed as a drawer and also comprises lateral guide rails and receptacles. The warm compartment 16 is supplied with exhaust air from the grill units 2, 4, to keep food stored therein warm. Above the cooling unit 14, a compartment 18 (shown in FIG. 1 in the open state) is provided in which, for example, dishes, plates or cutlery can be housed.

In the lower region of the base cabinet 8, a gas cylinder 20 is disposed (see FIG. 2), which is accessible via a door 22. The gas cylinder 20 is disposed on a gas cylinder receptacle 24 with a weighing unit. The weighing unit is connected to a control unit 26, which determines the gas volume of the gas cylinder 20 from its weight and a residual burn time of the grill device 1. The control unit 26 is coupled by means of W-LAN to a portable mobile device 28 (see FIG. 5) which communicates via W-LAN (indicated by the waves in FIG. 5) with the control unit 26. The portable mobile device 28 comprises a display 30, in particular a touch display, on which a residual grill time and a gas volume of the gas cylinder 20 are displayed.

Figure 1:
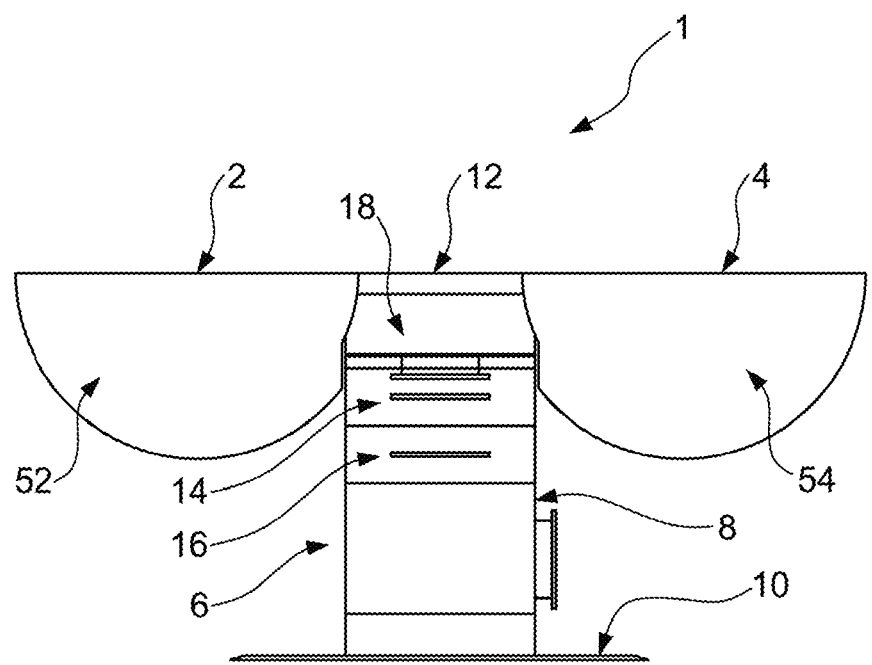
FIG. 1: shows a schematic front view of the grill device.
Figure 2:
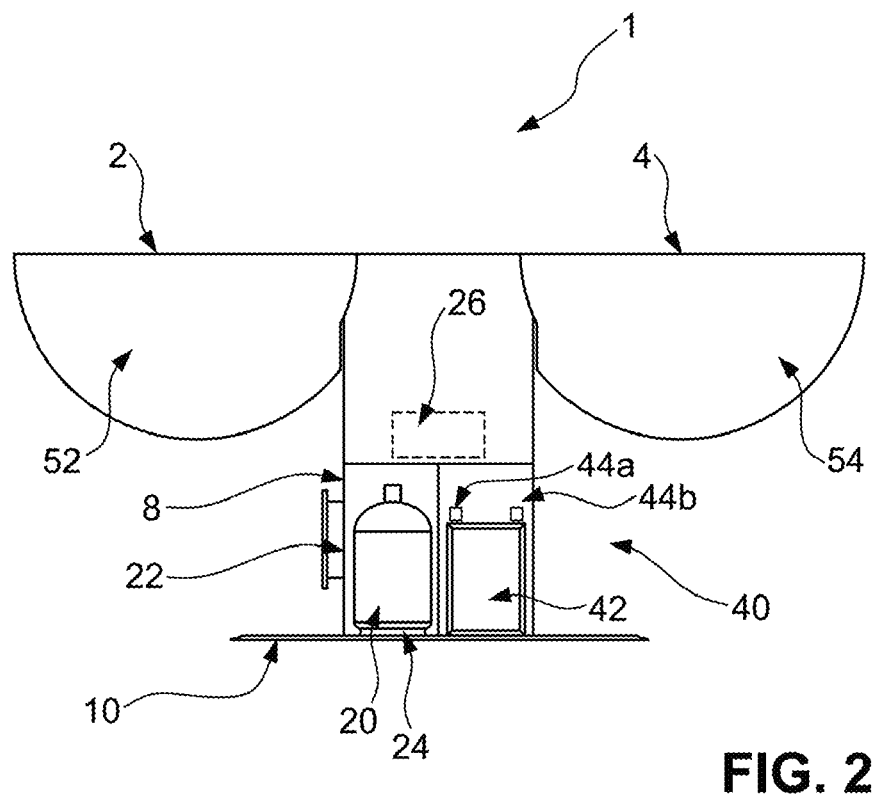
FIG. 2: shows a schematic rear view of the grill device.
Figure 3:
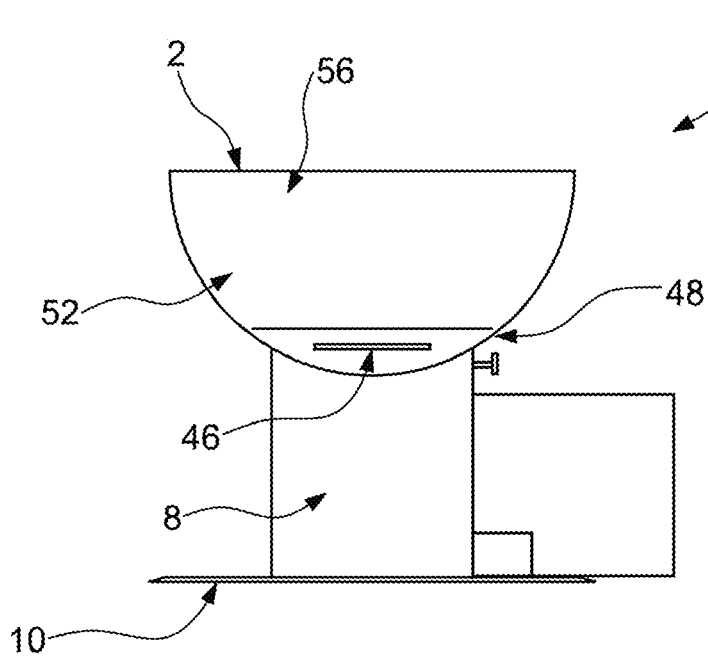
FIG. 3: shows a schematic side view of the grill device.

Control commands can also be given to the control unit 26 via the touch display 30, for example, for throttling valves between the gas cylinder 20 and the grill units 2, 4, or also for starting up a rinsing device 40 (FIGS. 2, 3).

The rinsing device 40 comprises a water tank 42 which comprises a fresh water container and a service water container (not shown separately). The rinsing device 40 is coupled to the control unit 26. Via valves 44a, 44b and corresponding pumps (not shown), the fresh water container and the service water container are connected to the grill units 2, 4 and supplies water to a rinsing element 46 (only one provided with reference numerals) (see FIG. 3). The rinsing element 46 is formed in accordance with a domestic dishwasher and it is set into rotation upon addition of fresh water. The rinsing element 46 is shown covered by means of a heat-insulating plate 48 in FIG. 3. The heat-insulating plate 48 can be manually removed from the grill unit 2, and the rinsing element 46 is thus exposed.

The grill units each comprise half-trays 52, 54, in which burning units (not shown), in particular burner strips for supplying gas, are disposed. The grill trays 52, 54 can also be used to receive solid fuel, such as, in particular, coal, pellets or the like. In the vicinity of an upper edge 56, 58, for example, a grill grate 60 is disposed (only shown in FIG. 4), which can be removed manually, but can also be rinsed by means of the rinsing device 40.

The two grill units 2, 4 are slidably and pivotally disposed on the stand 6, in particular on the base cabinet 8. In FIGS. 6 and 7, the two grill units 2, 4 are pushed towards one another and pivoted upwards, so that the upper edges 56, 58 of the grill trays 52, 54 meet and lie substantially flush against one another.

If the grill device 1 according to the present invention is used as a patio heater, it is preferable to use an insert between the two edges 56, 58 in the state shown in FIGS. 6 and 7, which holds the edges 56, 58 spaced from each other. The insert comprises a plurality of through holes, or is formed overall lattice-shaped. Thus, when the grill device 1 is operated in the state shown in FIG. 6 with the insert, warm air can escape through the insert and heat a patio environment.

Figure 8:
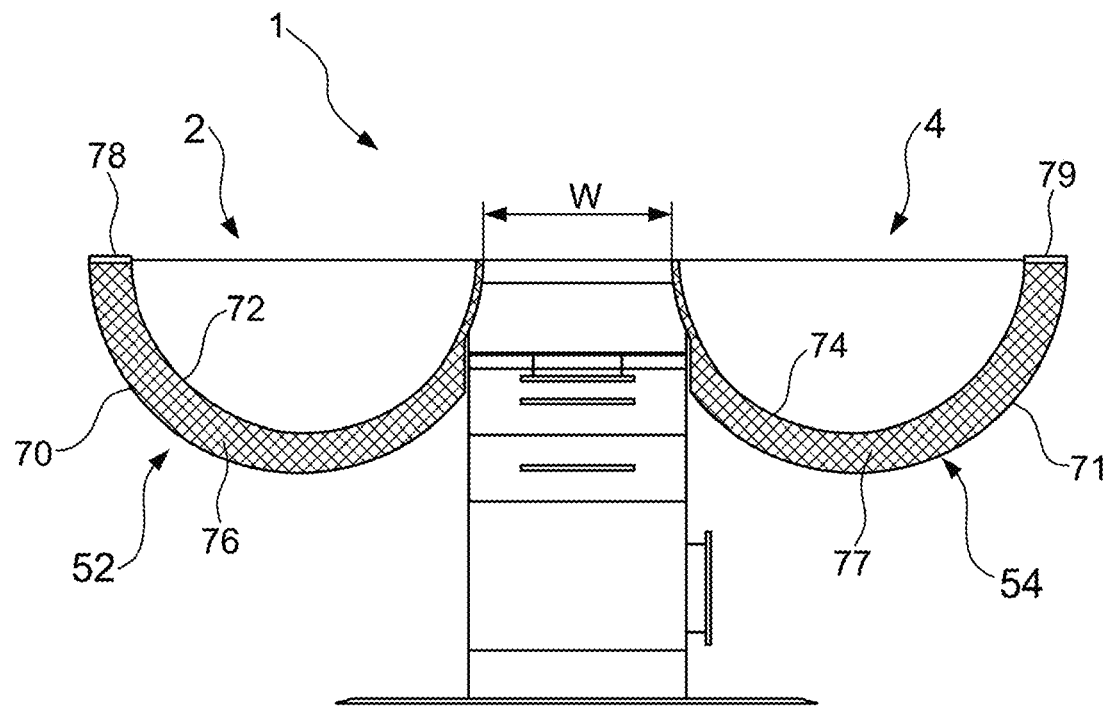
FIG. 8: a partial cross-section with double-walled grill trays.

According to FIG. 8, a variant is shown, in which the grill trays 52, 54 are formed double-walled. In addition to the outer first wall 70, 71, a second wall 72, 74 is disposed in the interior of the respective grill trays 52, 54, which wall is formed spaced from the first wall 70, 71. To connect the first and second walls 70, 72, or 71, 74, a perforated plate 78, 79 is provided, which is substantially annular, so that it can extend along the entire circumference of the respective grill trays 52, 54 (see also FIG. 4). An insulating material 76, 77 is disposed according to this embodiment between the inner and outer wall 70, 72, and 71, 74. In this embodiment, only one layer of insulating material 76, 77 is provided, which can be formed, for example, as glass wool, glass foam, rock wool, stone foam, mineral foam or the like. Preference is given to a mineral foam, as this is non-combustible and provides a certain rigidity and stability. If a material such as mineral foam is used, it is not necessary to provide a plurality of further connecting elements between the inner and outer walls 70, 72, and 71, 74, respectively, whereby thermal bridges can be largely avoided.

Figure 9:
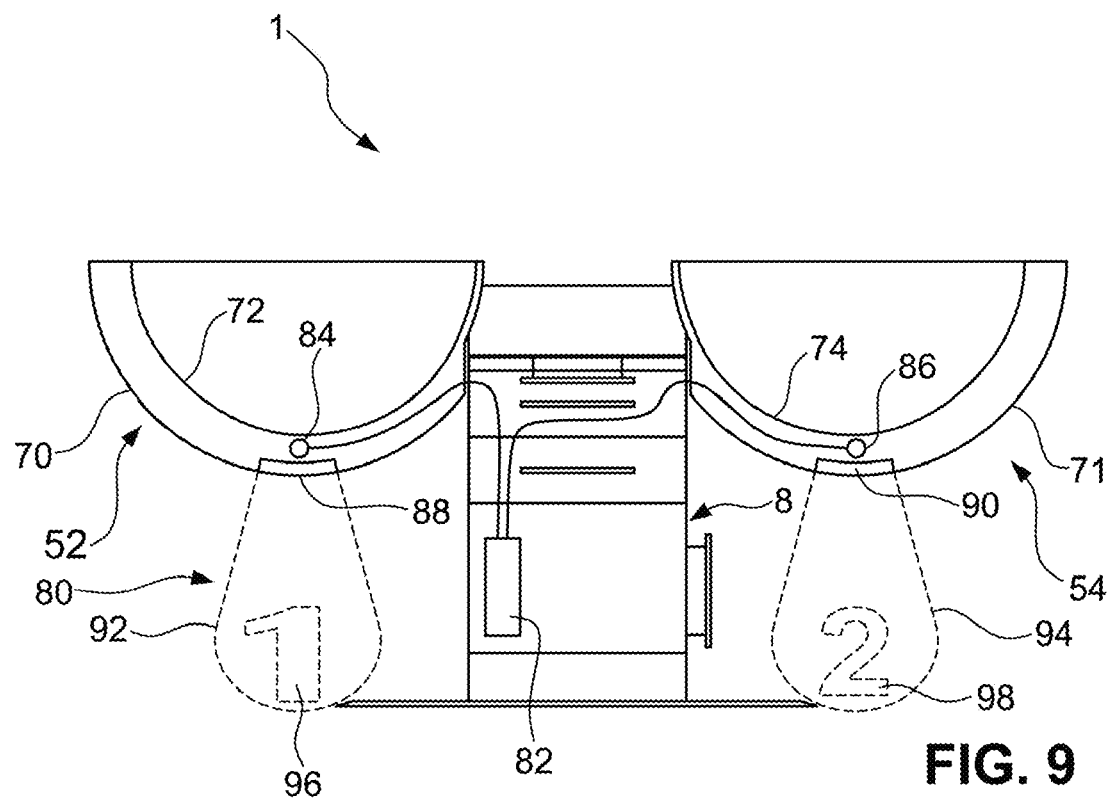
FIG. 9: a partial cross-section with an illumination device according to a first embodiment.

A further variant is shown according to FIG. 9, which comprises an illumination device 80. The illumination device 80 comprises a control unit 82, which is provided in the base cabinet 8 in this embodiment. The control device 82 preferably comprises an energy source, or is connectable to an energy source. The control device 82 is provided to control the illumination device 80.

The illumination device 80 in this exemplary embodiment comprises a first light source 84 and a second light source 86, which are each disposed between the outer wall 70, 71 and the inner wall 72, 74 of the grill trays 52, 54. The light sources 84, 86 can be formed, for example, as LEDs or the like. Preferably, between the inner wall 72, 74 and the outer wall 70, 71, an insulating material 76, 77, as described with reference to FIG. 8, is also disposed to protect the light sources 84, 86 from excessive heat input.

With reference to FIG. 9, lower ends of the grill trays 52, 54, which are directed in the open state to the ground, a slit or pattern 88, 90 is introduced, which in particular is introduced by laser cutting into the outer wall 70, 71 of the grill trays 52, 54. The slit or pattern 88, 90 is illuminated from the inside by means of the light sources 84, 86, so that a light cone 92, 94 passes to the outside. A pattern is formed on the ground as a shadow 96, 98, adjacent to the respective grill trays 52, 54, in which it specifies information. With reference to FIG. 9, the number 1 can thus be seen in the shadow 96 on the left-hand grill tray 52, while the number 2 can be seen on the right-hand side of FIG. 9 with the shadow 98. Any other information can be provided here, such as, in particular, pictograms of food, such as in particular fish, meat, vegetables or certain foods such as beef, pork, sausage, corncob, peppers, halloumi and the like. In this way, an operator or user of the grill device 1 can directly recognize which type of grill food is prepared on which grill tray 52, 54. This also avoids mixing vegetarian and non-vegetarian foods. In particular, this has great advantages for allergy sufferers who have to pay strict attention to a diet, in particular a poultry allergy, fish allergy or the like.

Instead of the slit 88, 90, any other type of projector can be used, in particular those as they are known from car doors that project a logo of the corresponding manufacturer or the like on the road in the open state. It can also be provided that the light sources 84, 86 can directly project the corresponding pattern onto the ground. In this case, it can be provided that the control unit 82 is programmable to select a corresponding projection. The control device 82 can comprise pre-stored patterns for this purpose, or an operator can program patterns via a corresponding connection.

Figure 10:
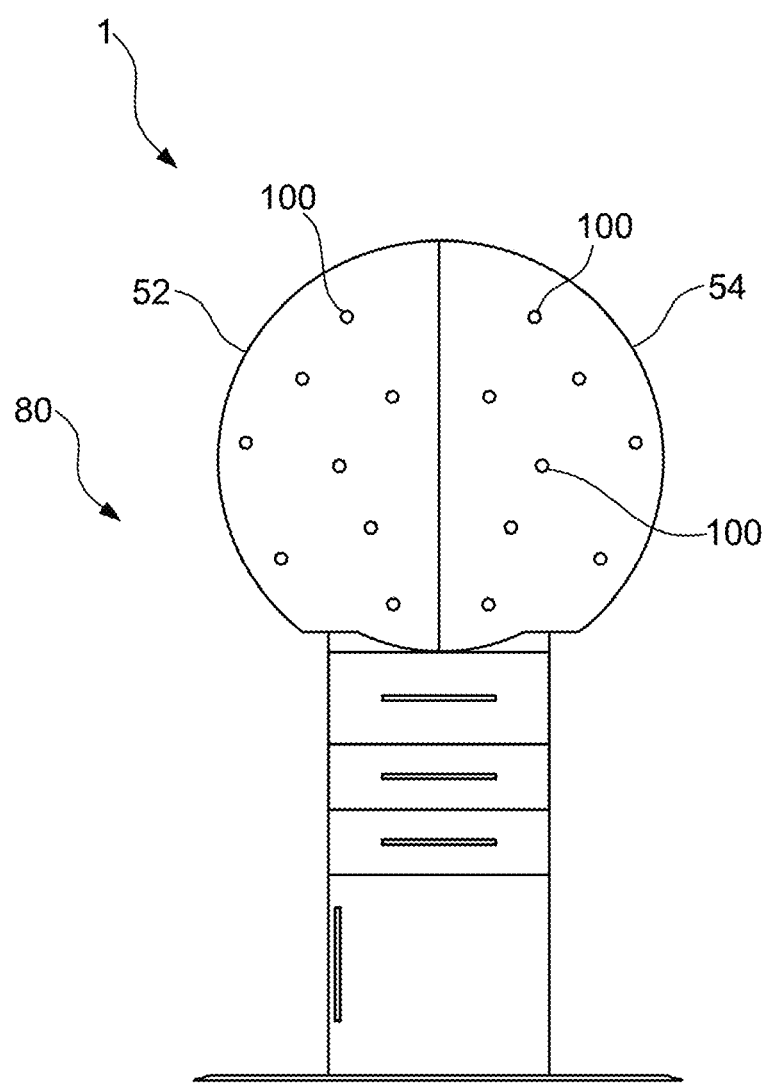
FIG. 10: a folded-together grill device having an illumination device according to a second exemplary embodiment.

In a further embodiment according to FIG. 10, the illumination device comprises a plurality of LED elements 100 (only three provided with reference symbols in FIG. 10), which are disposed in an irregular pattern on the outer wall 70, 71. The LED elements can be disposed in a pattern. In FIG. 10, the grill device 1 is shown with two hemispherical grill trays 52, 54, which are in the folded-together state in FIG. 10. For this reason, the upper part of the grill device 1 according to FIG. 10 is substantially spherical. Here it makes sense to arrange the individual LED elements 100 so that they represent a kind of starry sky. In this way, the grill device 1 can be used as a decorative object after completion of a grilling process or at times when the grilling operation is not needed. The illumination device 80 according to the exemplary embodiment from FIG. 10 also preferably comprises a control device 82, as has already been described with reference to FIG. 9.

It can be seen in particular from FIGS. 4 and 8 that the counter top 12 is substantially rectangular and has a width W and a depth T. The width W distances the two grill trays 52, 54 from each other. The width W is preferably in a range of 30 to 70 cm. As a result, the two grill trays 52, 54 are effectively separated from each other, in particular with regard to different grilled goods. It is particularly advantageous to use one of the grill trays 52, 54 for vegetarian food, while the other grill tray 52, 54 is used for non-vegetarian food. Where the counter top 12 has a width W, an effective separation takes place and grill food can not inadvertently get from one to the other grill tray 52, 54. There is a complete separation of the work areas, which is not only spatial, but can also be separated on the basis of the energy sources, as already described above.

The invention claimed is:

1. A grill device, comprising:
   at least a first gas grill unit and a second gas grill unit for cooking food, the first gas grill unit comprising a first grill tray having a first burning unit and the second gas grill unit comprising a second grill tray having a second burning unit;
   a stand supporting the first and second gas grill units;
   a base cabinet housed in the stand;
   a central work unit comprising a substantially rectangular counter top disposed at a head end of the stand; and
   one or more hoods configured to completely close the first and second grill trays,
   wherein the first and second gas grill units are fastened to the stand laterally from the work unit and spaced apart substantially opposite one another; and
   wherein the one or more hoods are each pivotally attached to a corresponding grill tray, the grill device further comprising a damper to dampen movement of the one or more hood.

2. The grill device of claim 1, further comprising a cooler in the base cabinet.

3. A grill device, comprising:
   at least a first gas grill unit and a second gas grill unit for cooking food, the first gas grill unit comprising a first grill tray having a first burning unit and the second gas grill unit comprising a second grill tray having a second burning unit;
   a stand supporting the first and second gas grill units;
   a base cabinet housed in the stand;
   a cooler in the base cabinet, wherein the cooler is formed as a closable refrigerator or lockable cooling compartment, and comprises lateral guide rails and receptacles for guiding a sheet or a plate; and
   a central work unit disposed at a head end of the stand, wherein the first and second gas grill units are fastened to the stand laterally from the work unit substantially opposite one another.

4. The grill device of claim 1, further comprising a warmer in the base cabinet.

5. A grill device, comprising:
   at least a first gas grill unit and a second gas grill unit for cooking food, the first gas grill unit comprising a first grill tray having a first burning unit and the second gas grill unit comprising a second grill tray having a second burning unit;
   a stand supporting the first and second gas grill units;
   a base cabinet housed in the stand;
   a warmer in the base cabinet, wherein the warmer comprises a warming cabinet or warm compartment in fluid communication with the first and second gas grill units such that warm air from the first and second gas grill units is guided into the warming cabinet or warm compartment; and
   a central work unit disposed at a head end of the stand, wherein the first and second gas grill units are fastened to the stand laterally from the work unit substantially opposite one another.

6. The grill device of claim 5, wherein the warmer comprises lateral guide rails and receptacles for guiding a sheet or a plate.

7. The grill device of claim 1, further comprising a gas cylinder receptacle for carrying a gas cylinder that supplies fuel gas to the first and second gas grill units, wherein the gas cylinder receptacle comprises a weighing unit for weighing the gas cylinder.

8. A grill device, comprising:
at least a first gas grill unit and a second gas grill unit for cooking food, the first gas grill unit comprising a first grill tray having a first burning unit and the second gas grill unit comprising a second grill tray having a second burning unit;
a stand supporting the first and second gas grill units;
a base cabinet housed in the stand;
a gas cylinder receptacle for carrying a gas cylinder that supplies fuel gas to the first and second gas grill units, wherein the gas cylinder receptacle comprises a weighing unit for weighing the gas cylinder;
a controller in electrical communication with the weighing unit, wherein the controller is configured to receive signals, from the weighing unit, which represent the weight of the gas cylinder, and to determine the gas volume in the gas cylinder based on the signals; and
a central work unit disposed at a head end of the stand, wherein the first and second gas grill units are fastened to the stand laterally from the work unit substantially opposite one another.

9. The grill device of claim 8, wherein the controller is configured to determine a residual burn time of the first and second gas grill units based on the signals.

10. The grill device of claim 9, further comprising a display configured to display the gas volume and/or the residual burn time.

11. The grill device of claim 9, wherein the controller is configured to be wirelessly connected to a portable mobile device.

12. The grill device of claim 11, wherein the controller is configured to transmit the weight of the gas cylinder, the gas volume, and/or the residual burn time to the portable mobile device for display on the mobile device.

13. The grill device of claim 11, wherein the controller is configured to receive control commands from the portable mobile device, and in response to control one or more valves connected to the gas cylinder.

14. The grill device of claim 11, wherein the portable mobile device is connected to the controller via Bluetooth®, W-LAN, and/or the Internet.

15. The grill device of claim 1, wherein the first and second grill trays are hemispherical.

16. The grill device of claim 1, wherein the first and second grill trays are trough-shaped, rectangular box-shaped, square box-shaped, cylindrical with a closed bottom, conically tapering down, frustoconical tapered down, or ellipsoid.

17. The grill device of claim 1, wherein the first and second burning units in the first and second grill trays are exchangeable for changing an energy source.

18. The grill device of claim 1, wherein the first and second grill trays are collapsible and/or foldable to jointly form a substantially closed space.

19. A grill device, comprising:
at least a first gas grill unit and a second gas grill unit for cooking food, the first gas grill unit comprising a first grill tray having a first burning unit and the second gas grill unit comprising a second grill tray having a second burning unit;
at least one insert configured to be disposed between the first and second grill trays, the insert comprising a plurality of passage openings;
a stand supporting the first and second gas grill units;
a base cabinet housed in the stand; and
a central work unit disposed at a head end of the stand, wherein the first and second grill trays are collapsible and/or foldable to jointly form a substantially closed space, and
wherein the first and second gas grill units are fastened to the stand laterally from the work unit substantially opposite one another.

20. The grill device of claim 1, further comprising a rinsing device configured to rinse and clean the grill device.

21. The grill device of claim 20, wherein the rinsing device comprises at least one rinsing element in each of the first and second grill trays.

22. The grill device of claim 21, wherein each rinsing element is configured to rotate.

23. The grill device of claim 21, further comprising removable heat-insulating plates configured to cover the at least one rinsing element during grill operation.

24. The grill device of claim 20, wherein the rinsing device comprises a service water container in the stand or the base cabinet, the service water container being configured to receive dirty water used for rinsing.

25. The grill device of claim 21, wherein the rinsing device comprises a water container in the stand or the base cabinet, the water container being configured to provide water used for rinsing, wherein the rinsing elements are fluidly connected to the water container.

26. The grill device of claim 20, wherein the rinsing device is controlled in accordance with commands received from a portable mobile device.

27. The grill device of claim 1, wherein the first and second grill trays are double-walled with a first outer wall and a second inner wall spaced from the first outer wall.

28. A grill device, comprising:
at least a first gas grill unit and a second gas grill unit for cooking food, the first gas grill unit comprising a first grill tray having a first burning unit and the second gas grill unit comprising a second grill tray having a second burning unit;
a stand supporting the first and second gas grill units;
a base cabinet housed in the stand; and
a central work unit disposed at a head end of the stand, wherein the first and second grill trays are double-walled with a first outer wall and a second inner wall spaced from the first outer wall, and a first insulating material disposed between the first and second walls, and
wherein the first and second gas grill units are fastened to the stand laterally from the work unit substantially opposite one another.

29. The grill device of claim 28, further comprising a second insulating material different from the first insulating material disposed between the first and second walls.

30. A grill device, comprising:
at least a first gas grill unit and a second gas grill unit for cooking food, the first gas grill unit comprising a first grill tray having a first burning unit and the second gas grill unit comprising a second grill tray having a second burning unit, wherein the first and second grill trays are double-walled with a first outer wall and a second inner wall spaced from the first outer wall;

an illumination device disposed at least partially within an intermediate space between the first and second walls;
a stand supporting the first and second gas grill units;
a base cabinet housed in the stand; and
a central work unit disposed at a head end of the stand,
wherein the first and second gas grill units are fastened to the stand laterally from the work unit substantially opposite one another.

31. The grill device of claim 30, wherein the first outer wall defines at least one opening for light exit.

32. The grill device of claim 27, further comprising at least one projector configured to project user information onto a projection surface adjacent to the grill device.

33. The grill device of claim 32, wherein the at least one projector comprises a slit disposed on the first outer wall and a light source disposed between the first and second walls.

34. The grill device of claim 32, wherein the user information is the type of food to be prepared on the respective grill tray.

35. The grill device of claim 30, wherein the illumination device comprises a plurality of LEDs disposed in a predetermined pattern in the outer first wall.

\* \* \* \* \*